United States Patent [19]

Griffin

[11] 4,345,878
[45] Aug. 24, 1982

[54] APPARATUS FOR CHANGING BELTS

[75] Inventor: Charles K. Griffin, Auburn, N.Y.

[73] Assignee: Carrier Corporation, Syracuse, N.Y.

[21] Appl. No.: 165,434

[22] Filed: Jul. 2, 1980

[51] Int. Cl.³ .................... F04B 49/00; F04B 35/04
[52] U.S. Cl. .................................. 417/15; 417/362; 474/26
[58] Field of Search .................. 474/26, 110, 114; 417/38, 362

[56] References Cited

U.S. PATENT DOCUMENTS

| 2,369,044 | 7/1942 | Hallinan | 236/10 |
| 2,910,879 | 11/1959 | Hands | 474/110 |
| 2,934,022 | 4/1960 | Rodick et al. | 474/26 |
| 3,178,067 | 4/1965 | Bell et al. | 417/362 |
| 3,425,288 | 2/1969 | Golden et al. | 474/26 |
| 3,678,773 | 7/1972 | Rohrback | 474/26 |
| 3,954,018 | 5/1976 | O'Berto | 474/11 |
| 4,027,358 | 6/1977 | Llach | 19/106 |
| 4,122,974 | 10/1978 | Harbert | 221/13 |

Primary Examiner—William L. Freeh
Attorney, Agent, or Firm—J. Raymond Curtin; David J. Zobkiw

[57] ABSTRACT

The belt of a variable speed fan drive is replaced without the use of tools. The high speed limit switch is bypassed and an override connection switch striker is provided which permits further movement of the motor base beyond the high speed limit when the high speed limit switch is bypassed.

3 Claims, 3 Drawing Figures

APPARATUS FOR CHANGING BELTS

BACKGROUND OF THE INVENTION

Any variable speed fan drive using a variable diameter sheave and a movable motor base must have positive stops or limit switches to prevent movement of the base beyond the maximum and minimum speed positions. The fan speed is automatically adjusted by a combination of movement of the motor and changing the effective diameter of the variable sheave mounted on the motor shaft. Such automatic adjustments are conventional. To replace the variable speed belt, it is necessary to move the base of the motor past the high speed limit switch controlled position so that the belt can be easily slipped off and on the pulley. Conventionally, the high speed limit switch or stop would be removed or repositioned in an operation requiring tools and the motor base would then be moved to the desired position to permit replacement of the belt. In such a case, after the new belt is installed and the motor is repositioned, there is a possibility that the high limit switch or stop would either not be repositioned or would be incorrectly repositioned which could result in the failure of the device.

SUMMARY OF THE INVENTION

The present invention overcomes the problems of the prior art by providing a manual means for bypassing the high speed limit switch rather than requiring removing or repositioning the switch and thereby permits replacement of the belt without requiring the use of tools. Further, the high speed limit switch is automatically enabled when the system is again placed in the automatic mode. When the high speed limit switch is bypassed the contact of the base with the switch is ineffective to prevent further movement of the base, and an override connection permits further movement without damage to the switch.

It is an object of this invention to provide an apparatus for replacing the belt of a variable speed fan drive without requiring the use of tools.

It is an additional object of this invention to provide an apparatus for replacing the belt of a variable speed fan drive without requiring the changing of the settings of the limit switches.

It is a further object of this invention to provide a switch striker which permits further movement through an override connection. These objects, and others as will become apparent hereinafter, are accomplished by the present invention.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
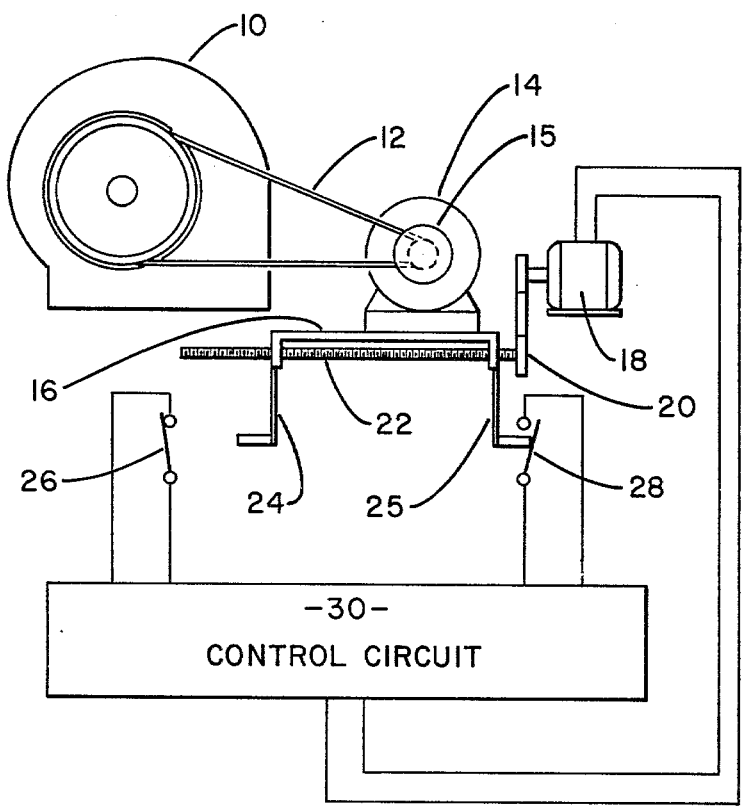
FIG. 1 is a schematic diagram of the apparatus.

In FIG. 1, the numeral 10 designates a fan which is driven by motor 14 having variable sheave 15 through belt 12. Motor 14 is on movable base 16 which is reciprocably driven by reversible motor 18 through gear train 20 and screw 22. Motor 18 is responsive to system demand and positions the motor 14 through movement of base 16 in response to the demand with the movable sheave 15 being automatically repositioned when the base 16 is moved so that belt 12 is kept tight. Mounted on base 16 are limit switch strikers 24 and 25 which, respectively, open high speed limit switch 26 and low speed limit switch 28. Switches 26 and 28 are in an electric control circuit 30 which is shown in detail in FIG. 2.

Figure 2:
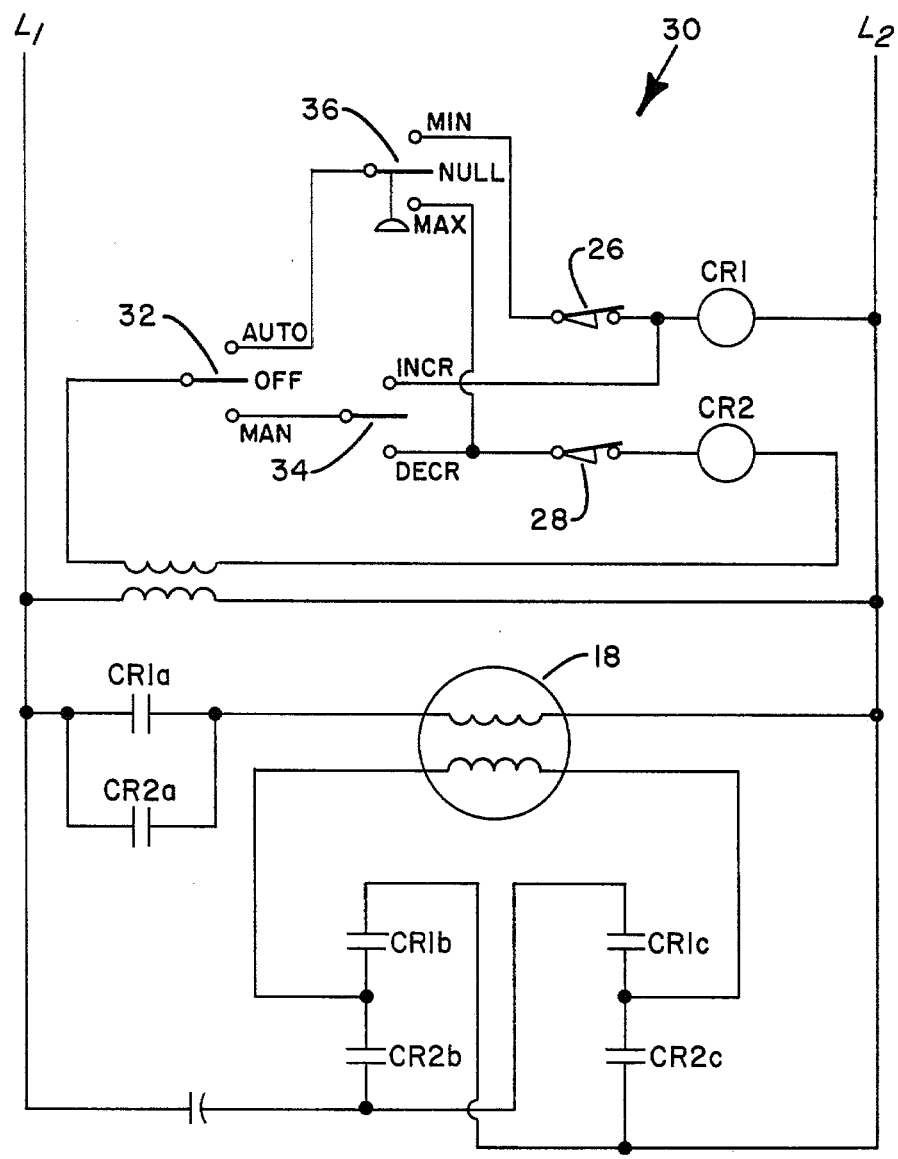
FIG. 2 is a schematic diagram of the control circuit.

In FIG. 2, the numeral 30 generally designates a control circuit for controlling the motor 18 and includes a mode switch 32, fan speed switch 34, system duct mounted air pressure switch 36 for sensing demand, and control relays CR1 and CR2. With mode switch 32 in the "automatic" position air pressure switch 36 is enabled and, upon sensing changing demand in the system duct, moves to the "minimum" or "maximum" setting to respectively cause the raising and lowering of the fan speed. When switch 36 is in the "minimum" pressure position control relay CR1 is enabled which causes the closing of contacts CR1a-c which causes motor 18 to run in a direction to increase the speed of fan 14. When the speed of fan 14 has been increased sufficiently, the switch 36 will be moved to the "null" position to disable relay CR1 and open contacts CR1a-c. Similarly, when switch 36 is in the "maximum" pressure position, control relay CR2 is enabled which causes the closing of contacts CR2a-c which causes motor 18 to run in a direction to decrease the speed of fan 14. When the speed of fan 14 has been decreased sufficiently, the switch 36 will be moved to the null position to disable relay CR2 and open contacts CR2a-c.

Figure 3:
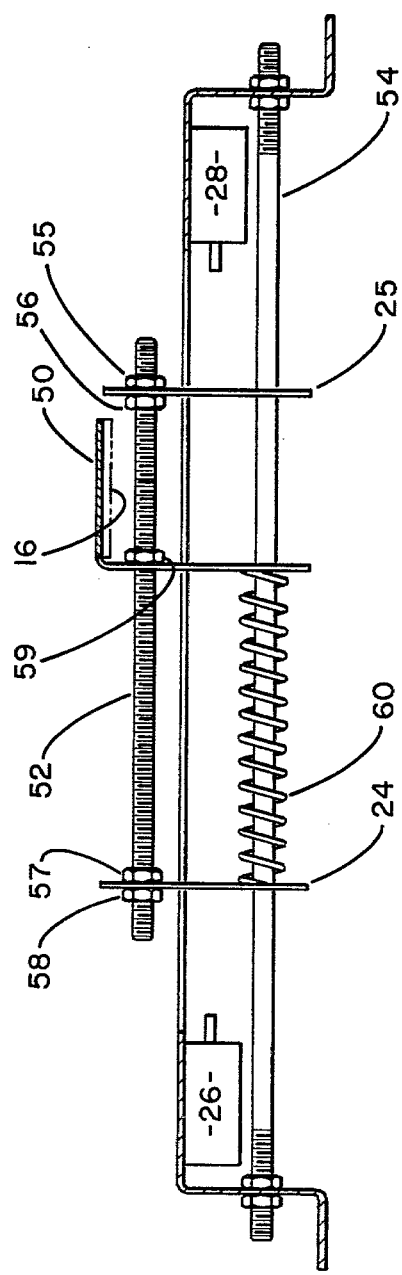
FIG. 3 is a side view of the limit switch strikers.

As best shown in FIG. 3, in ordinary operation, the limit switch strikers 24 and 25 move as a rigid unit with base 16, plate 50 and threaded rod 52. Rod 54 serves as a guide for the movement of switch strikers 24 and 25 as well as for the plate 50. Striker 24 is fixidly located on threaded rod 52 by nuts 57 and 58 on each side of strikers 24. Similarly, striker 25 is fixidly located on threaded rod 52 by nuts 55 and 56. Plate 50 is prevented from moving toward striker 25 by nut 59 and is ordinarily prevented from moving toward striker 24 by spring 60 which affords an override connection when the belt 12 is being changed.

OPERATION

With the mode switch 32 in its automatic position, system duct pressure will act on air pressure switch 36 to cause the increase or decrease in the speed of fan 10. The speed of fan 10 is dependent upon the effective diameter of variable sheave 15 of motor 14. The effective diameter of sheave 15 is automatically changed in accordance with the position of base 16 as is conventional. As illustrated in FIG. 1, the base 16 is at the low speed limit and has opened low speed limit switch 28 since further movement in that direction would stretch and/or break the belt 12. The base 16 will be moved and the fan speed thereby changed in response to the demand sensed by the air pressure switch 36. However if the demand is too high or too low such that switch 26 or 28 is opened, then further movement of the base 16 in the direction controlled by the opened switch is prevented while the switch is held open but movement in the opposite direction is still possible.

If it is desired to replace belt 12, it is necessary to move the base 16 past the high speed limit switch position which would correspond to a position where the belt 12 is approaching the outer diameter of sheave 15. To achieve this, mode switch 32 is put into the manual position and fan switch 34 is momentarily manually held at the "increase" position, the high speed limit switch 26 is thereby bypassed and motor 18 is able to drive base 16 and thereby motor 14 past the high speed limit position, an amount determined by the length of the override connection. When base 16 is driven past the high speed limit switch position, only plate 50 moves with the base 16. The movement of the plate 50 causes the compression of spring 60 to define the override connection since this movement of the base 16 and plate 50 does not cause the movement of strikers 24 and 25. The release of switch 34 will stop the movement of base 16 after it has reached the desired position. The belt 12 can then be removed and replaced with a new belt. Switch 34 would then be manually held in the "decrease" position to move base 16 back to a normal operating position in order to tighten the belt. Switch 34 would then be released and switch 32 would be placed in the automatic mode.

Although a preferred embodiment of the present invention has been illustrated and described, other changes will occur to those skilled in the art. For example, although the invention was described in terms of a fan driven though a variable sheave motor mounted on a movable base other arrangements and applications are possible such as where another element of the drive such as the driven device is moved rather than the driving device. It is therefore intended that the scope of the present invention is to be limited only by the scope of the appended claims.

I claim:

1. Motor position control apparatus with a manual limit switch bypass for use in changing belts comprising:
   (1) demand sensing means;
   (2) driven means;
   (3) variable sheave driving means for driving said driven means;
   (4) belt means for drivably connecting said driving and driven means;
   (5) means for positioning said driving means in response to said demand sensing means;
   (6) switch actuator means carried by said driving means; and
   (7) control circuit means including:
      (a) first limit switch means for preventing further movement of said driving means towards said driven means past a limiting position wherein said first limit switch means are opened by said switch actuator means;
      (b) second limit switch means for preventing further movement of said driving means away from said driven means past a limiting position wherein said second limit switch means are opened by said switch actuator means;
      (c) manually actuated bypass means for bypassing said first limit switch means; and
      (d) manually actuated means for causing said driven means to move past the limiting position in which said first limit switch means are opened when said manually actuated bypass means are actuated whereby said belt means can be removed and replaced without the use of tools.

2. The apparatus of claim 1 wherein said switch actuator means includes override connection switch striker means to permit the movement of said driving means past the limiting position in which said first limit switch means are open when said manually actuated bypass means are actuated.

3. The apparatus of claim 2 wherein said switch striker means includes:
   first and second switch striker means; plate means adapted to be connected to said driving means and located intermediate said first and second switch striker means;
   means for maintaining a fixed minimum distance between said second striker means and said plate means; and
   resilient means for maintaining a normally fixed minimum distance between said first switch striker means and said plate means and for providing an override connection when said plate means is forced toward first switch striker means with enough force to overcome said resilient means.

* * * * *